US012713348B2

(12) United States Patent
Uziel et al.

(10) Patent No.: US 12,713,348 B2
(45) Date of Patent: Aug. 18, 2026

(54) ADAPTIVE PROCESSING ENVELOPE BASED ON POWER CONSUMPTION

(71) Applicant: QUALCOMM Incorporated, San Diego, CA (US)

(72) Inventors: Lior Uziel, Hod Hasharon (IL); Guy Wolf, Rosh Haayin (IL); Assaf Touboul, Netanya (IL)

(73) Assignee: Qualcomm Incorporated, San Diego, CA (US)

(*) Notice: Subject to any disclaimer, the term of this patent is extended or adjusted under 35 U.S.C. 154(b) by 284 days.

(21) Appl. No.: 17/877,773

(22) Filed: Jul. 29, 2022

(65) Prior Publication Data

US 2024/0040506 A1 Feb. 1, 2024

(51) Int. Cl.
*H04W 52/02* (2009.01)

(52) U.S. Cl.
CPC ..... *H04W 52/0229* (2013.01); *H04W 52/028* (2013.01)

(58) Field of Classification Search
CPC ........................ H04W 52/0229; H04W 52/028
See application file for complete search history.

(56) References Cited

U.S. PATENT DOCUMENTS

2019/0104475 A1 4/2019 Lukaszewski et al.
2019/0230590 A1 7/2019 Wu et al.
2020/0015132 A1* 1/2020 Liu ..................... H04W 36/385
2020/0218548 A1* 7/2020 Wan .................. H04W 52/0203
2020/0403761 A1* 12/2020 Nguyen ................ H04L 5/0094
2023/0171644 A1* 6/2023 Gan .................. H04W 28/0958 370/235
2024/0205690 A1* 6/2024 Kurian .................. H04W 72/52

FOREIGN PATENT DOCUMENTS

WO WO-2021242389 A1 12/2021

OTHER PUBLICATIONS

International Search Report and Written Opinion—PCT/US2023/069896—ISA/EPO—Oct. 25, 2023.

* cited by examiner

*Primary Examiner* — Muthuswamy G Manoharan
(74) *Attorney, Agent, or Firm* — Holland & Hart LLP

(57) ABSTRACT

Methods, systems, and devices for wireless communications are described. Generally, the described techniques provide for reconfiguring a resource envelope allocated to a distributed unit (DU) or a radio unit (RU) based on power consumption at the DU or the RU. A virtual radio access network (VRAN) manager (e.g., a host platform for a VRAN) may perform baseband pooling to allocate a resource envelope to a DU or an RU. After an initial allocation of a resource envelope to a DU or an RU, the DU, the RU, or both may report an amount of power consumed during signal processing for one or more dimensions of the resource envelope. The VRAN manager may then reconfigure a resource envelope for the DU or the RU based on the power consumption at these devices (e.g., to minimize operating expenses (OPEX) or maximize utilization of the resource envelope).

20 Claims, 14 Drawing Sheets

Receive, from a second network entity, a first processing envelope for signal processing at the first network entity, the signal processing associated with providing communications for user equipments (UEs)

1305

Send, to a second network entity, a report based at least in part on an amount of power consumed at the first network entity during signal processing, the report comprising a power consumption value for each of a plurality of values along one or more dimensions supported by the first processing envelope

1310

Receive, from the second network entity, a second processing envelope for the signal processing at the first network entity, the second processing envelope being based at least in part on sending the report

1315

1300

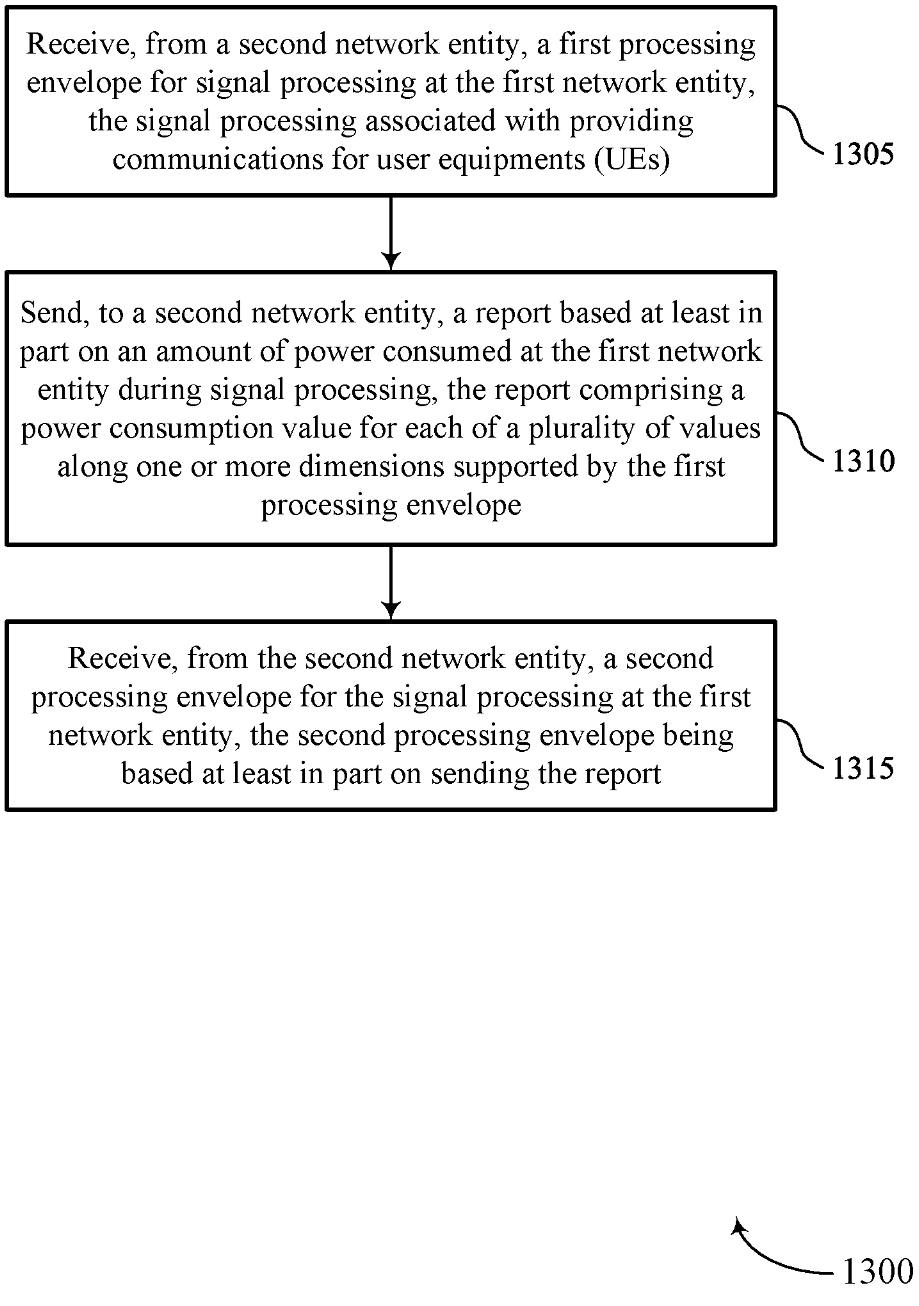

FIG. 13

ADAPTIVE PROCESSING ENVELOPE BASED ON POWER CONSUMPTION

FIELD OF TECHNOLOGY

The following relates to wireless communications, including adaptive processing envelope based on power consumption.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations, each supporting wireless communication for communication devices, which may be known as user equipment (UE). Some wireless communications systems may support baseband pooling, where processing resources may be allocated in pools to network entities. The processing resources may include hardware or software used to perform signal processing (e.g., memory or internal processing resources). Improved techniques for using baseband pooling to efficiently utilize processing resources may be desirable.

SUMMARY

The described techniques relate to improved methods, systems, devices, and apparatuses that support an adaptive processing envelope based on power consumption. Generally, the described techniques provide for reconfiguring a resource envelope allocated to a distributed unit (DU) or a radio unit (RU) based on power consumption at the DU or the RU. A virtual radio access network (VRAN) manager (e.g., a host platform for a VRAN) may perform baseband pooling to allocate a resource envelope to a DU or an RU. After an initial allocation of a resource envelope to a DU or an RU, the DU, the RU, or both may report metrics for assistance in system level power consumption optimization. For example, the DU or RU may report an amount of power consumed during signal processing for one or more dimensions of the resource envelope. Different dimensions of the resource envelope may include a different quantity of layers, a different quantity of carriers, a different bandwidth part, a different power back-off, etc. The VRAN manager may then reconfigure a resource envelope for the DU or the RU based on the power consumption at these devices (e.g., to minimize operating expenses (OPEX) or maximize utilization of the resource envelope).

(This summary will be completed upon final approval of the claims)

BRIEF DESCRIPTION OF THE DRAWINGS

FIGS. 13 and 14 show flowcharts illustrating methods that support an adaptive processing envelope based on power consumption in accordance with one or more aspects of the present disclosure.

DETAILED DESCRIPTION

Figure 1:
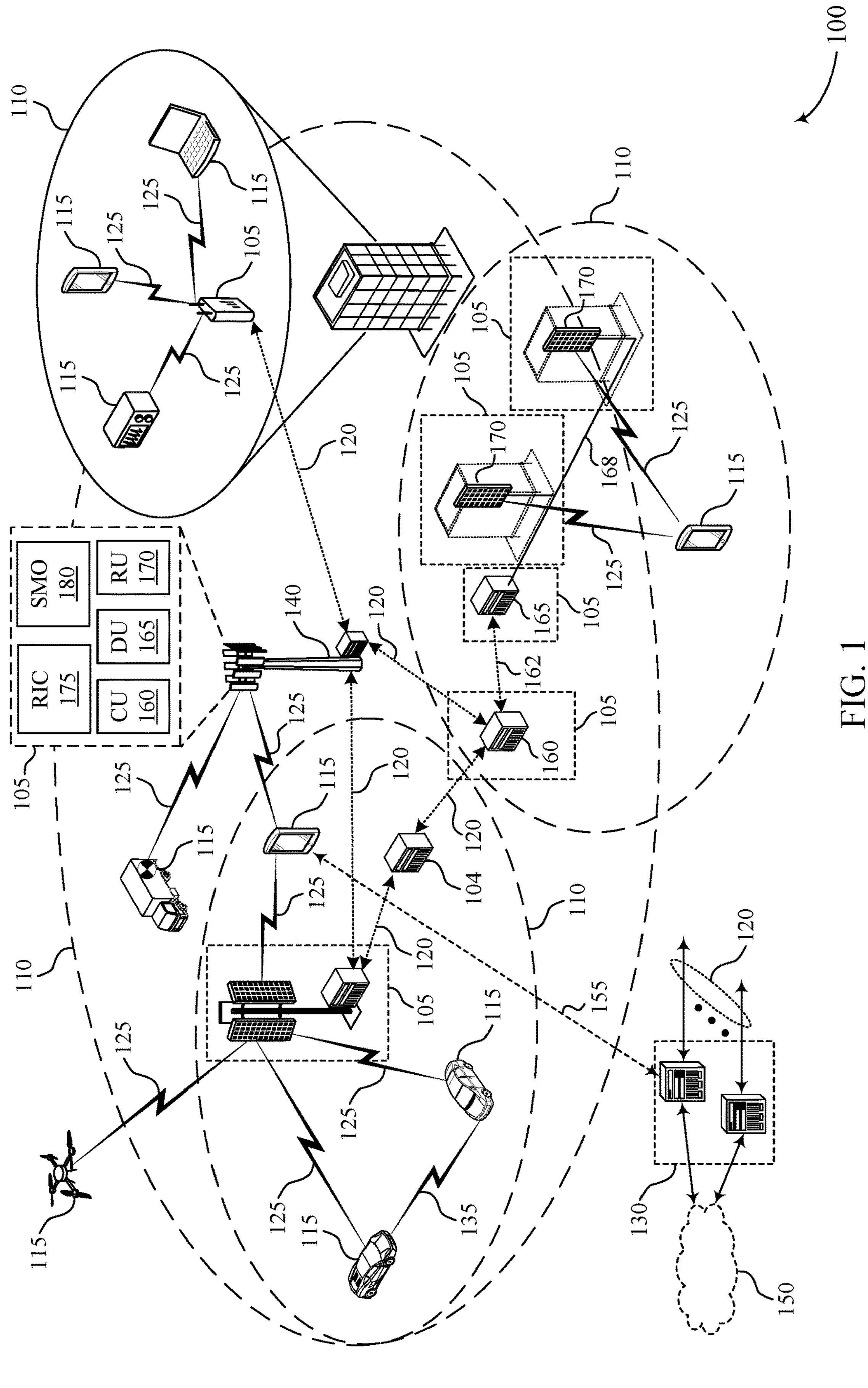
FIG. 1 illustrates an example of a wireless communications system that supports an adaptive processing envelope based on power consumption in accordance with one or more aspects of the present disclosure.

Some wireless communications systems may support baseband pooling, where processing resources may be allocated in pools to network entities. The processing resources may include hardware or software used to perform signal processing (e.g., memory or internal processing resources). A pool of processing resources allocated to a network entity may be referred to as a baseband resource envelope. A baseband resource envelope may be a virtualization of a pool of processing resources and may refer to resources (e.g., physical resources) for which a network entity may perform signal processing. For instance, a baseband resource envelope may be subject to, or depend on a number of layers, a number of component carriers (e.g., per layer), and a range of frequency resources (e.g., per component carrier). A network entity may then perform signal processing for a baseband resource envelope, and the signal processing may not be expected to exceed a maximum capacity of a pool of processing resources corresponding to the baseband resource envelope.

In some aspects, a distributed unit (DU) may be configured with a baseband resource envelope for signal processing, and the DU may be connected to one or more radio units (RUs). The DU may allocate its baseband resource envelope to the one or more RUs in one or more sub-envelopes, and the DU may perform signal processing for each RU in accordance with the sub-envelope allocated to the RU. The signal processing performed by the DU for an RU may support communications between the RU and one or more user equipments (UEs). In some cases, however, the baseband resource envelope configured at the DU may be static (e.g., a static envelope configuration), and the sub-envelope allocated to each of the one or more RUs may also be static. Accordingly, a network may be unable to adapt the baseband resource envelope allocated to a DU, and the DU may not maximize the use of a pool of processing resources corresponding to the baseband resource envelope. In addition, a network may be unable to perform system optimization (e.g., optimization of a transmit power, a number of antennas, a digital pre-distortion (DPD), etc.) for communications at RUs. As a result, there may be excessive power consumption at the DU and higher operating expenses (OPEX) in the network.

As described herein, a wireless communications system may support efficient techniques for reconfiguring a baseband resource envelope allocated to a DU or an RU based on power consumption at the DU or the RU. A virtual radio access network (VRAN) manager (e.g., a host platform for a VRAN) may perform baseband pooling to allocate a baseband resource envelope to a DU or an RU. After an initial allocation of a baseband resource envelope to a DU or an RU, the DU, the RU, or both may report an amount of power consumed during signal processing for one or more dimensions of the baseband resource envelope. Different dimensions of the baseband resource envelope may include a different quantity of layers, a different quantity of carriers, a different bandwidth part, a different power back-off, etc. (e.g., different distributions of the resources of the baseband resource envelope). In some examples, different dimensions of the baseband resource envelope may be associated with different power consumption values based on one or more conditions (e.g., Doppler, affecting performance at a receiver such as tile size, which may, in turn, affect power consumption). The VRAN manager may then reconfigure a baseband resource envelope for the DU or the RU based on the power consumption at these devices (e.g., to minimize OPEX or maximize utilization of a pool of processing resources corresponding to the baseband resource envelope).

Aspects of the disclosure are initially described in the context of wireless communications systems. Examples of processes and signaling exchanges that support adaptive processing envelope based on power consumption are then described. Aspects of the disclosure are further illustrated by and described with reference to apparatus diagrams, system diagrams, and flowcharts that relate to adaptive processing envelope based on power consumption.

FIG. 1 illustrates an example of a wireless communications system 100 that supports an adaptive processing envelope based on power consumption in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, anode of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In the case of the techniques described herein applied in the context of a disaggregated RAN architecture, one or more components of the disaggregated RAN architecture may be configured to support adaptive processing envelope based on power consumption as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The wireless communications system 100 may support baseband pooling, where processing resources may be allocated in pools to network entities 105. The processing resources may include hardware or software used to perform signal processing (e.g., memory or internal processing resources). A pool of processing resources allocated to a network entity 105 may be referred to as a baseband resource envelope. A baseband resource envelope may be a virtualization of a pool of processing resources and may refer to resources (e.g., physical resources) for which a network entity 105 may perform signal processing. For instance, a baseband resource envelope may include a number of layers, a number of component carriers (e.g., per layer), and a range of frequency resources (e.g., per component carrier). A network entity 105 may then perform signal processing for a baseband resource envelope, and the signal processing may not be expected to exceed a maximum capacity of a pool of processing resources corresponding to the baseband resource envelope.

In some aspects, a DU may be configured with a baseband resource envelope for signal processing, and the DU may be connected to one or more RUs. The DU may allocate its baseband resource envelope to the one or more RUs in one or more sub-envelopes, and the DU may perform signal processing for each RU in accordance with the sub-envelope allocated to the RU. The signal processing performed by the DU for an RU may support communications between the RU and one or more UEs 115. In some cases, however, the baseband resource envelope configured at the DU may be static (e.g., a static envelope configuration), and the sub-envelope allocated to each of the one or more RUs may also be static. Accordingly, a network may be unable to adapt the baseband resource envelope allocated to a DU, and the DU may not maximize the use of a pool of processing resources corresponding to the baseband resource envelope. In addition, a network may be unable to perform system optimization (e.g., optimization of a transmit power, a number of antennas, a DPD, etc.) for communications at RUs. As a result, there may be excessive power consumption at the DU and higher OPEX in the network.

The wireless communications system 100 may support efficient techniques for reconfiguring a baseband resource envelope allocated to a DU or an RU based on power consumption at the DU or the RU. A VRAN manager (e.g., a host platform for a VRAN) may perform baseband pooling to allocate a baseband resource envelope to a DU or an RU.

After an initial allocation of a baseband resource envelope to a DU or an RU, the DU, the RU, or both may report an amount of power consumed during signal processing for one or more dimensions of the baseband resource envelope. Different dimensions of the baseband resource envelope may include a different quantity of layers, a different quantity of carriers, a different bandwidth part, a different power back-off, etc. (e.g., different distributions of the resources of the baseband resource envelope). The VRAN manager may then reconfigure a baseband resource envelope for the DU or the RU based on the power consumption at these devices (e.g., to minimize OPEX or maximize utilization of a pool of processing resources corresponding to the baseband resource envelope).

Figure 2:
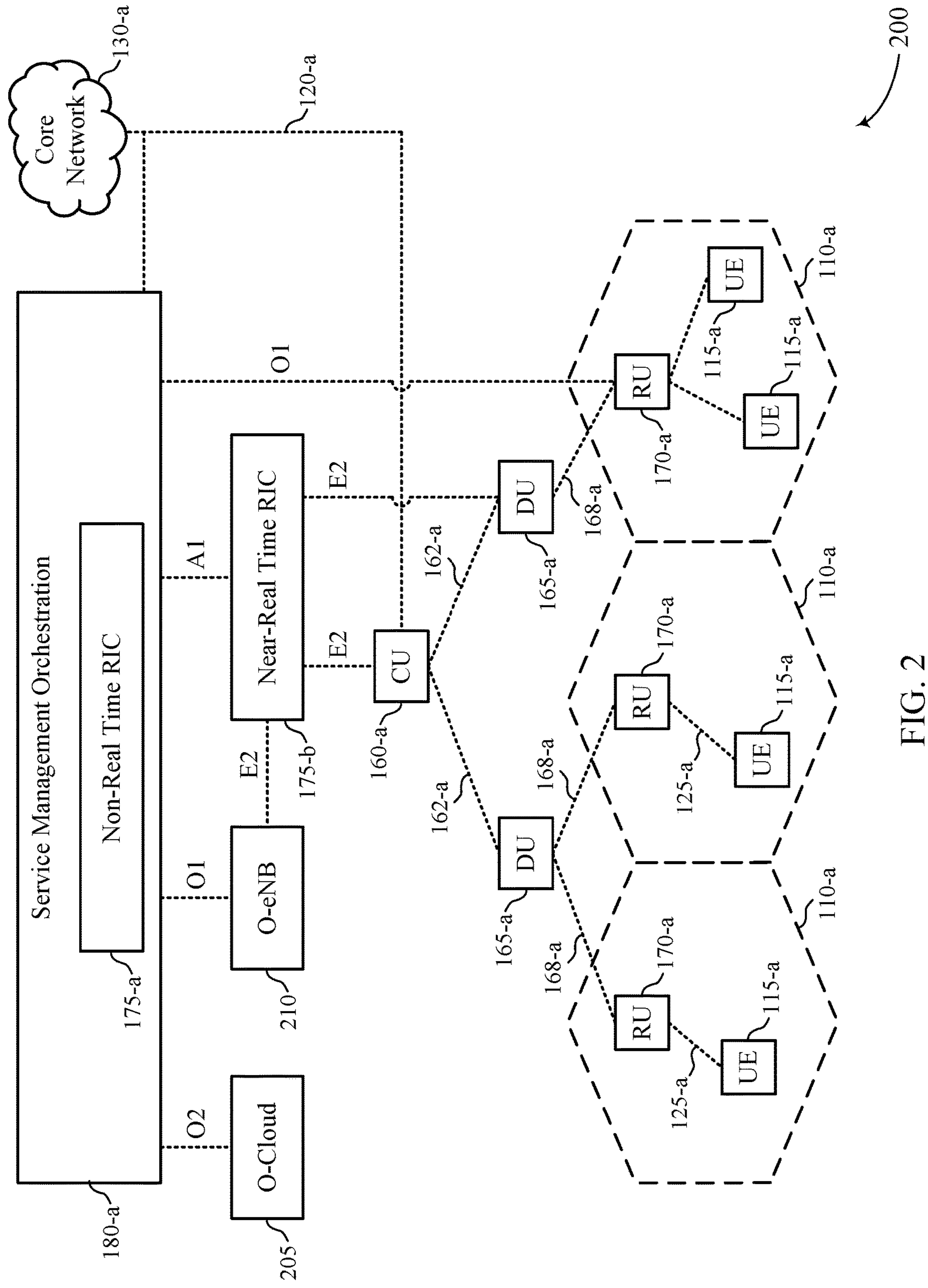
FIG. 2 illustrates an example of a wireless communications system that supports an adaptive processing envelope based on power consumption in accordance with one or more aspects of the present disclosure.

FIG. 2 illustrates an example of a network architecture 200 (e.g., a disaggregated base station architecture, a disaggregated RAN architecture) that supports an adaptive processing envelope based on power consumption in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g. via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

The network architecture 200 may support baseband pooling, where processing resources may be allocated in pools to network entities 105. The processing resources may include hardware or software used to perform signal processing (e.g., memory or internal processing resources). A pool of processing resources allocated to a network entity 105 may be referred to as a baseband resource envelope. A baseband resource envelope may be a virtualization of a pool of processing resources and may refer to resources (e.g., physical resources) for which a network entity 105 may perform signal processing. For instance, a baseband resource envelope may include a number of layers, a number of component carriers (e.g., per layer), and a range of frequency resources (e.g., per component carrier). A network entity 105 may then perform signal processing for a baseband envelope, and the signal processing may not be expected to exceed a maximum capacity of a pool of processing resources corresponding to the baseband envelope.

In some aspects, a DU 165 may be configured with a baseband resource envelope for signal processing, and the DU 165 may be connected to one or more RUs 170. The DU 165 may allocate its baseband resource envelope to the one or more RUs 170 in one or more sub-envelopes, and the DU 165 may perform signal processing for each RU 170 in accordance with the sub-envelope allocated to the RU 170. The signal processing performed by the DU 165 for an RU 170 may support communications between the RU 170 and one or more UEs 115. In some cases, however, the baseband resource envelope configured at the DU 165 may be static, and the sub-envelope allocated to each of the one or more RUs 170 may also be static (e.g., a static envelope configuration). Accordingly, a network may be unable to adapt the baseband resource envelope allocated to a DU 165 or an RU 170, and the DU 165 or the RU 170 may not maximize the use of a pool of processing resources corresponding to the baseband resource envelope. As a result, there may be excessive power consumption at the DU 165 or the RU 170 and higher OPEX in the network.

The network architecture 200 may support efficient techniques for reconfiguring a baseband resource envelope allocated to a DU 165 or an RU 170 based on power consumption at the DU 165 or the RU 170. A VRAN manager (e.g., a host platform for a VRAN) may perform baseband pooling to allocate a baseband resource envelope to a DU 165 or an RU 170. After an initial allocation of a baseband resource envelope to a DU 165 or an RU 170, the DU 165, the RU 170, or both may report an amount of power consumed during signal processing for one or more dimensions of the baseband resource envelope. Different dimensions of the baseband resource envelope may include a different quantity of layers, a different quantity of carriers, a different bandwidth part, a different power back-off, etc. (e.g., different distributions of the resources of the baseband resource envelope). The VRAN manager may then reconfigure a baseband resource envelope for the DU 165 or the RU 170 based on the power consumption at these devices (e.g., to minimize OPEX or maximize utilization of a pool of processing resources corresponding to the baseband resource envelope).

Figure 3:
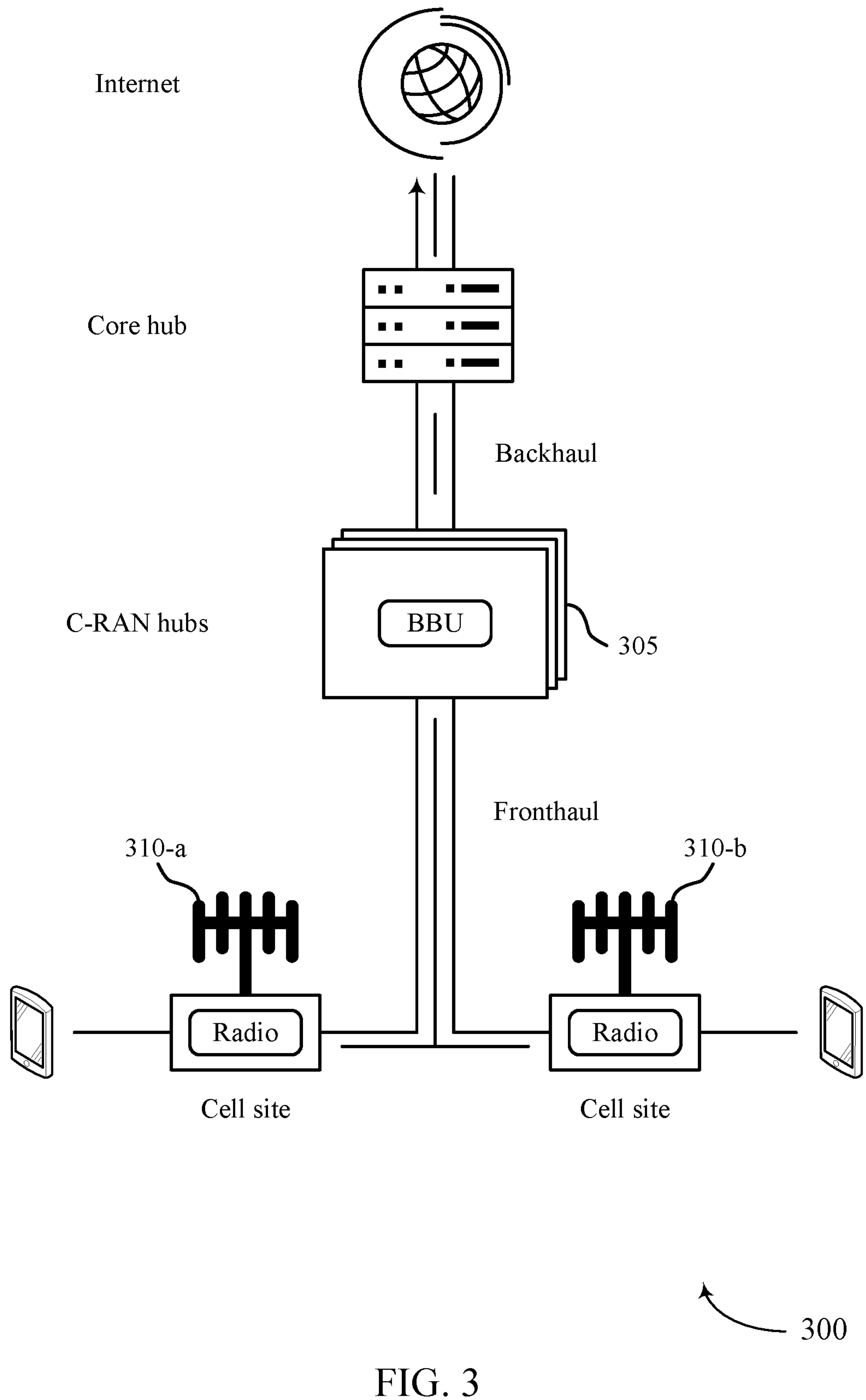
FIG. 3 illustrates an example of baseband pooling in accordance with one or more aspects of the present disclosure.

FIG. 3 illustrates an example of baseband pooling 300 in accordance with one or more aspects of the present disclosure. In VRAN applications, where baseband pooling is utilized, a centralized baseband unit (BBU) 305 (e.g., a DU) processes the physical layer of many non-collocated sites 310 (e.g., a first RU 310-*a* and a second RU 310-*b*). For the sake of capital expense (CAPEX) optimization, it may be customary to dimension the baseband capacity in the RAN to sub-envelope use cases of the system capacity, where it is not assumed that maximum capacity is achievable at all sites at any time. The CAPEX and achievable capacity may therefore be dictated by the actual RAN infrastructure, the baseband modems maximal layer one (L1) processing envelope, and there may be a system trade-off that permits adding L1 resources to the baseband pool at the expense of increasing CAPEX. Such an increase of L1 resources may also have a direct impact on overall RAN infrastructure power consumption and correspondingly on system OPEX. In some cases, power consumption may be a critical key performance indicator (KPI) for VRAN OPEX due to the implications of cooling and an L1 resource increase in the VRAN servers. The L1 PHY resource achievable envelope therefore becomes a critical parameter for VRAN cost structure optimization. Because there may be a baseband pooling-based trade off between required resources (e.g., for channel conditions, coverage, scheduling, etc.) and power consumption, power consumption reporting may assist in baseband pooling, taking the KPI of power consumption as a threshold or parameter.

In VRAN applications with baseband pooling, the L1 physical resource envelope (e.g., baseband resource envelope) may be dimensioned into or dependent on a quantity of layers, a quantity of frequency resources (e.g., MHz), and a quantity of component carriers (e.g., #layers*MHz*#component carriers). For example, when serving non-collocated sites (e.g., RUs), a BBU serving a massive MIMO site may likely demand a large quantity of layers (e.g., 16) with a low quantity of component carriers (e.g., 2), or a BBU serving non-massive MIMO sites (e.g., which have smaller layer dimensions) may likely demand a smaller quantity of layers (e.g., 8, 4, or 2) with a larger quantity of component carriers (e.g., 32, 16, or 8) for supporting many RUs. In some cases, a VRAN system may be provisioned based on a static envelope configuration of L1 resources (e.g., according to open RAN (ORAN) specifications or commercial VRAN implementations). Upon initialization of a carrier in VRAN, baseband resources may be allocated based on its supported envelope subject to a quantity of layers, a quantity of frequency resources (e.g., a bandwidth part (BWP) size of each carrier), and a quantity of component carriers supported by the envelope. In some examples, the resource envelope may depend on an algorithm configuration (e.g., an equalizer density).

Figure 4:
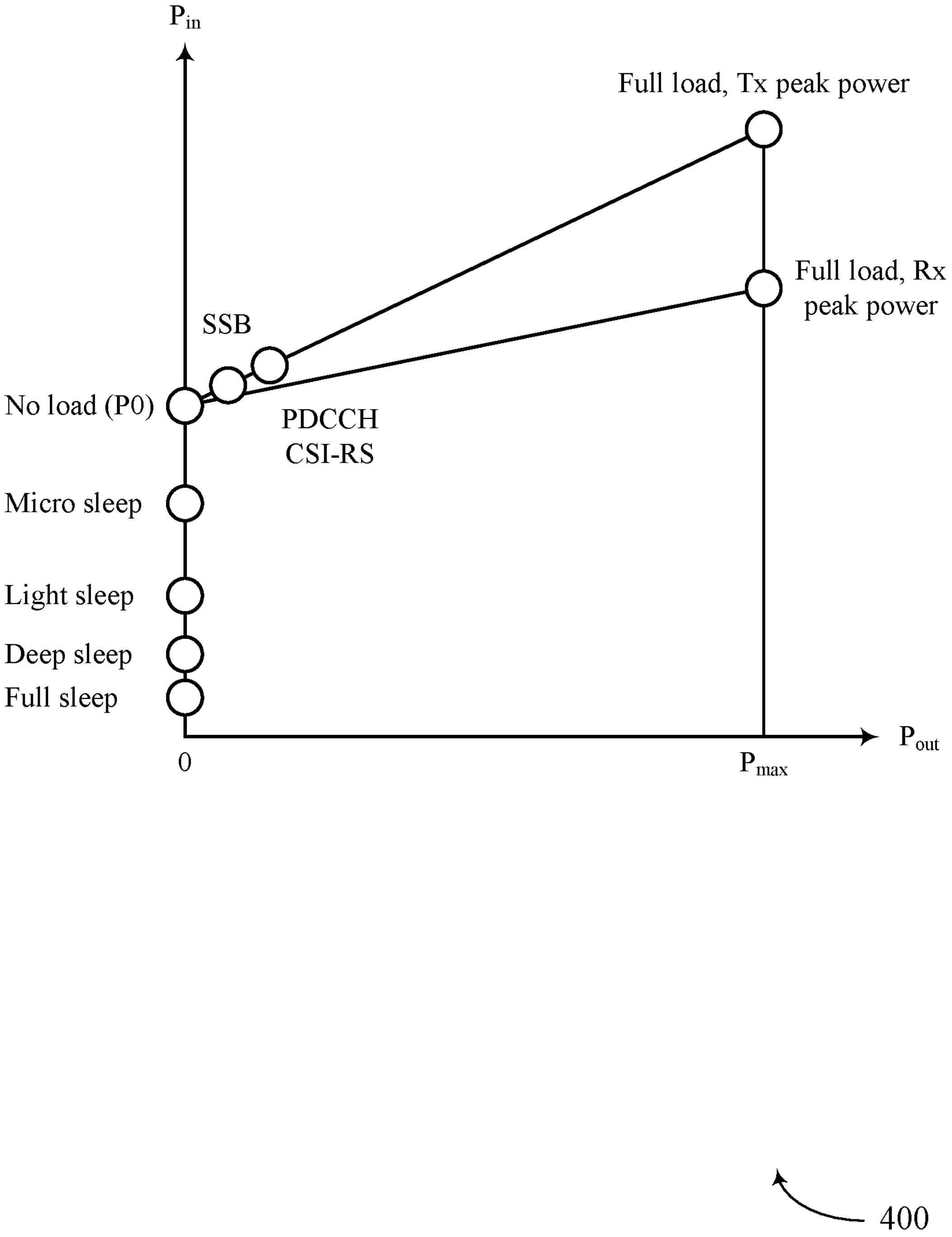
FIG. 4 illustrates an example of radio frequency or radio unit (RU) power consumption in accordance with one or more aspects of the present disclosure.

FIG. 4 illustrates an example of radio frequency or RU power consumption 400 in accordance with one or more aspects of the present disclosure. The overall power consumption which affects the OPEX of an RU may also be subject to dynamic behavior. The dynamic behavior of an RU may be different along different dimensions of a resource envelope at the RU used to provide communications to one or more UEs. One example attribute affecting dynamic VRAN power consumption may be per slot, actual physical allocations. The per slot, actual physical allocations may be affected by traffic patterns and link budgets, providing a product of a quantity of layers, a quantity of physical resource blocks (PRBs), and a quantity of symbols (e.g., MHz*μsec) for the UEs at each component carrier. In some cases, an RU power may reduce with reduced load, which may reduce power consumption (e.g., where power consumption may also be based on the activation of power saving modes at a network entity). Another example attribute affecting dynamic VRAN power consumption may be an RU configuration. The RU configuration may include a quantity of power amplifiers (PAs) (e.g., with corresponding power efficiencies) and a quantity of antenna elements. Yet another example attribute affecting dynamic VRAN power consumption may be a transmitted power. The transmitted power may be a transmit power of an RU (e.g., based on overall network and cell requirements) and may be based on DPD methods (e.g., based on capabilities of both network entities and UEs and a PA efficiency).

Figure 5:
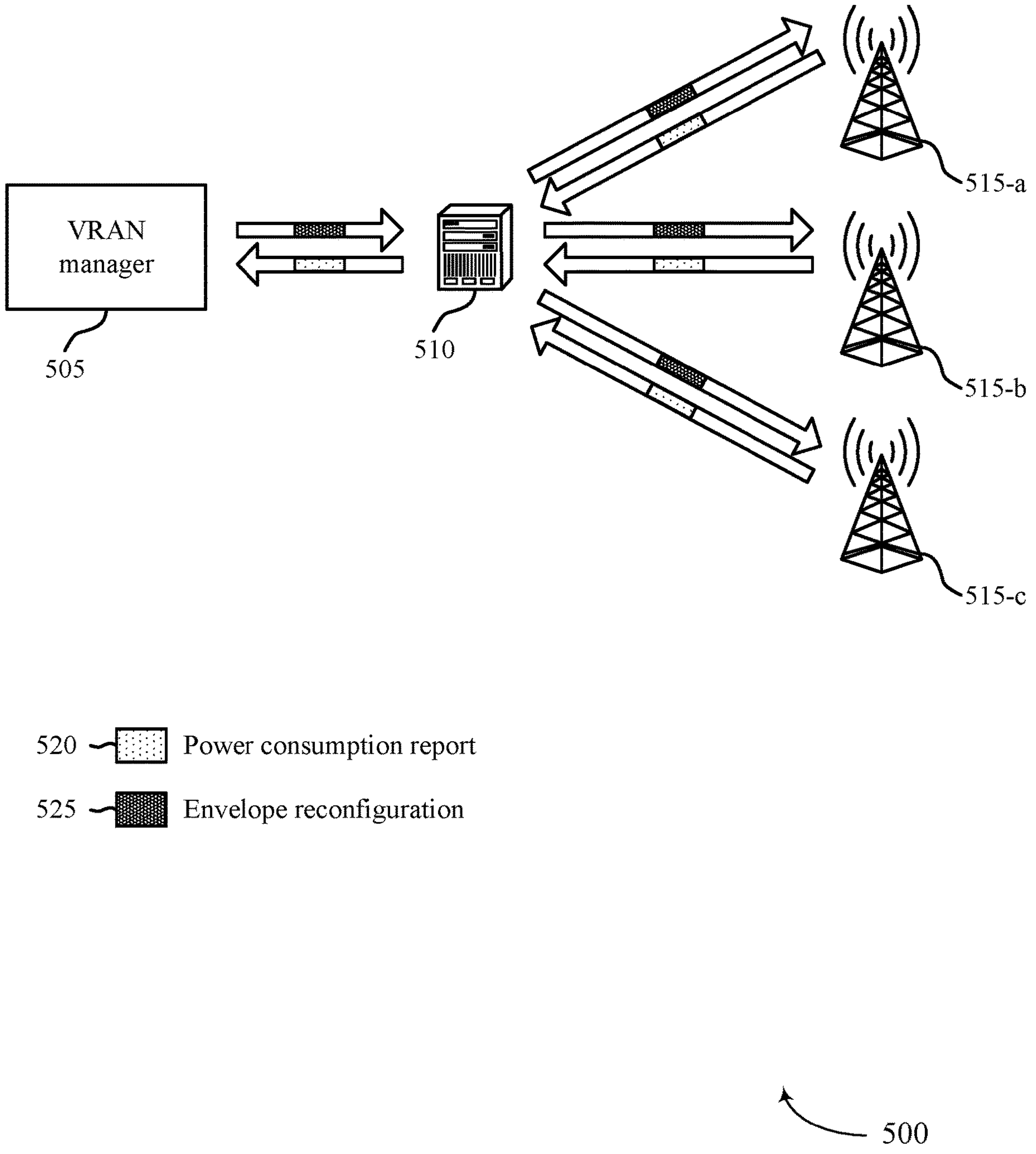
FIG. 5 illustrates an example of a wireless communications system that supports an adaptive processing envelope based on power consumption in accordance with one or more aspects of the present disclosure.

FIG. 5 illustrates an example of a wireless communications system 500 that supports an adaptive processing envelope based on power consumption in accordance with one or more aspects of the present disclosure. The wireless communications system 500 includes a VRAN manager 505, which may be an example of a VRAN manager described with reference to FIGS. 1-4. The wireless communications system 500 also includes a DU 510, which may be an example of a DU described with reference to FIGS. 1-4. The wireless communications system 500 also includes an RU 515-*a*, an RU 515-*b*, and an RU 515-*c*, which may be examples of RUs described with reference to FIGS. 1-4. The wireless communications system 500 may implement aspects of the wireless communications system 100 or the network architecture 200. For instance, the wireless communications system 500 may support efficient techniques for reconfiguring a processing envelope for signal processing at the DU 510 or the RUs 515 or both based on power consumption at the DU 510 or the RUs 515.

The VRAN manager 505 may provide an initial configuration or pre-configuration of a resource envelope (e.g., baseband resource envelope) for signal processing at the DU 510 and a resource envelope for each RU 515. The DU 510 (e.g., physical layer) may provide processing values (e.g., memory or internal resources) per allocated resources (e.g., to the VRAN manager 505), and each RU 515 (e.g., radio frequency transmitter and receiver) may provide PA efficiency graphs per Pin (e.g., power saving modes) plus DPD reduction values per ecoefficiency (e.g., to the VRAN manager 505). The initial configuration of the resource envelope for the DU 510 may be based on the processing values provided by the DU 510, and the initial configuration of the resource envelope for each RU 515 may be based on the PA efficiency graphs and DPD reduction values provided by the RU 515.

After the initial configuration of the resource envelope at the DU 510 and each RU 515, the VRAN manager 505 may use the techniques described herein to reconfigure the resource envelope at the DU 510 or one or more of the RUs 515. The described techniques introduce a set of reports provided by the DU 510 (e.g., DU L1 infrastructure) to the VRAN manager 505 (e.g., the VRAN), a set of reports provided by each RU 515 (e.g., RU infrastructure) to the VRAN manager 505 (e.g., the VRAN), and a set of corresponding configurations (e.g., configuration adjustments) to L1 that may allow the VRAN manager 505 to optimize the envelope (e.g., temporary envelope) and condition the DU or RU L1 configuration to the attributes affecting power consumption in a dynamic fashion. The set of reports sent by the DU 510 to the VRAN manager 505 may be sent over a functional application platform interface (FAPI), and the set of reports sent by the RU 515 to the VRAN manager 505 may be sent over an ORAN interface.

Figure 6:
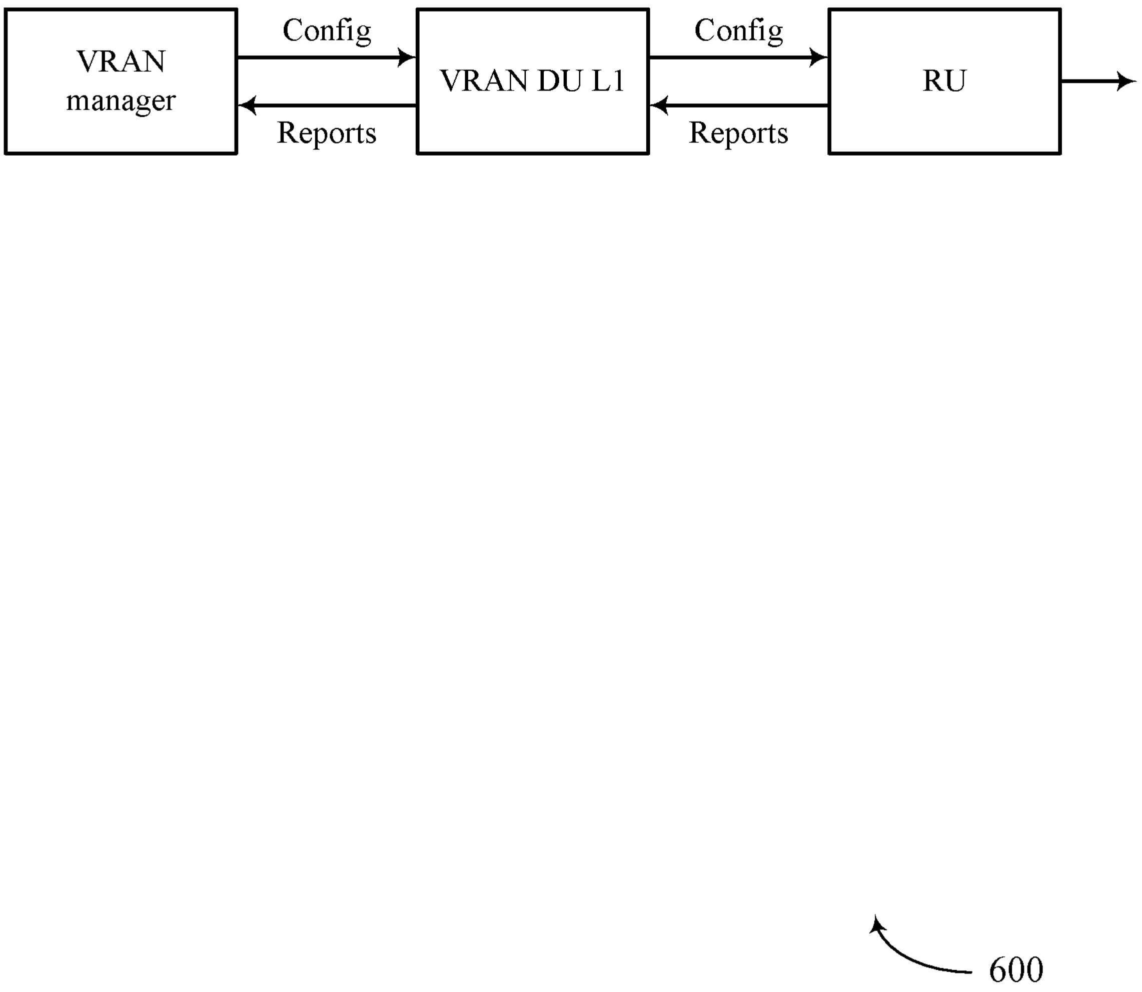
FIG. 6 illustrates an example of configuration and report signaling that supports an adaptive processing envelope based on power consumption in accordance with one or more aspects of the present disclosure.

FIG. 6 illustrates an example of the configuration and report signaling 600 that supports an adaptive processing envelope based on power consumption in accordance with one or more aspects of the present disclosure.

In one aspect, the DU 510 may send a power consumption report 520 (e.g., physical based report) to the VRAN manager 505 providing metrics for power consumption at the DU 510 subject to dimensioning conditions. For instance, each RU 515 connected to the DU 510 may be allocated a sub-envelope of a resource envelope of the DU 510, and the RU 515 may communicate using a particular dimension of the sub-envelope (e.g., a quantity of layers, a quantity of frequency resources, and a quantity of component carriers). The DU 510 may measure the power consumption for performing signal processing for the RU 515 according to the sub-envelope allocated to the RU 515, and the DU 510 may report the power consumption for each RU 515 to the VRAN manager 505. The DU 510 may also indicate the dimension of a sub-envelope of the RU 515 associated with the power consumption at the DU 510. As such, the VRAN manager 505 may be able to populate a table with power consumption values for different values along one or more dimensions supported by the resource envelope of the DU 510.

Table 1 shows an example of a table which may include power consumption values for different values along one or more dimensions supported by a resource envelope.

TABLE 1

| Power consumption values for different values along one or more dimensions | | | | | | | |
|---|---|---|---|---|---|---|---|
| | 10 PRBs | 20 PRBs | 50 PRBs | 100 PRBs | 150 PRBs | 200 PRBs | 250 PRBs |
| 1 Layer | | | | | | | |
| 2 Layers | | | | | | | |
| 4 Layers | | | | | | | |
| 8 Layers | | | | | | | |
| 16 Layers | | | | | | | |

The DU 510 may provide the information (e.g., power consumption values) for low, medium, or high correlation for each RU 515 (e.g., since the correlation may impact the Equalizer density and signal processing complexity with direct implication on DU power consumption). Further, the DU 510 may provide a metric of the empirical correlation experienced by the received demodulated layers. The correlation for each RU 515 may refer to the correlation of signals received at the RU 515 or transmitted by the RU 515. For instance, signals received from UEs 115 that are within the same region may have high correlation, while signals received from UEs 115 that are in different regions may have low correlation. Similarly, signals transmitted to UEs 115 that are within the same region may have high correlation, while signals transmitted to UEs 115 that are in different regions may have low correlation.

Given the knowledge of the impact of DU modem power consumption at the VRAN in addition to the measured layer correlation experienced from over-the-air received signals processed by the DU 510, the VRAN manager 505 may optimize its L1 DU physical resource allocations by considering infrastructure system power consumption. That is, the wireless communications system 500 may support techniques for system adaptation and may introduce a centralized RAN (CRAN) adaptation entity. Further, the wireless communications system 500 may support techniques to adapt to a changed envelope. An envelope reconfiguration 525 (e.g., reconfigured or updated resource envelope) may be notified to the physical layer (e.g., reducing memory, reducing energy consumption, reparsing internal processing resources), and the envelope may include a quantity of layers, a quantity of component carriers, a bandwidth part within the component carriers or CRANs, a quantity of scheduled UEs, spatial multiplexing between UEs, etc. Thus, in the VRAN, the techniques may provide for processing pooling between the VRANs.

In another aspect, an RU 515 may send a power consumption report 520 (e.g., physical based report) to the VRAN manager 505 (e.g., via the DU 510) providing metrics for power consumption at the RU 515 subject to dimensioning conditions. For instance, an RU 515 may be allocated a sub-envelope of a resource envelope of the DU 510, and the RU 515 may communicate using a particular dimension of the sub-envelope (e.g., a quantity of PRBs and a power backoff). The RU 515 may measure the power consumption for performing signal processing according to the sub-envelope, and the RU 515 may report the power consumption to the VRAN manager 505. The RU 515 may also indicate the dimension of a sub-envelope at the RU 515 associated with the power consumption at the RU 515. As such, the VRAN manager 505 may be able to populate a table with power consumption values for different values along one or more dimensions supported by the sub-envelope of the RU 515.

Table 2 shows an example of a table which may include power consumption values for different values along one or more dimensions supported by a resource envelope.

TABLE 2

| Power consumption values for different values along one or more dimensions | | | | | | | |
|---|---|---|---|---|---|---|---|
| | 10 PRBs | 20 PRBs | 50 PRBs | 100 PRBs | 150 PRBs | 200 PRBs | 250 PRBs |
| 0 dB Power backoff | | | | | | | |
| 3 dB Power backoff | | | | | | | |
| 6 dB Power backoff | | | | | | | |
| 9 dB Power backoff | | | | | | | |
| 12 dB Power backoff | | | | | | | |

The information (e.g., power consumption values) provided by the RU 515 to the VRAN manager 505 may be dependent on the RU radio frequency design involving DPD or receiver frequency design involving channel estimation and loop-based tiling. Further, the RU 515 may report its temporary empirical power consumption allowing direct visibility by the VRAN of the actual conceived power consumption at the RU 515. Given the knowledge of the impact of RU radio frequency power consumption at the VRAN, the VRAN may optimize its site geometry or bandwidth coverage by considering RU system power consumption. The VRAN system may then react using dynamic configuration of power (e.g., a quantity of layers or an allocation of a quantity of PRBs) for the RU based on overall RU power consumption optimization. The VRAN system may indicate an envelope reconfiguration 525 for the RU, reflecting the dynamic configuration of baseband pooling for the RU.

Figure 7:
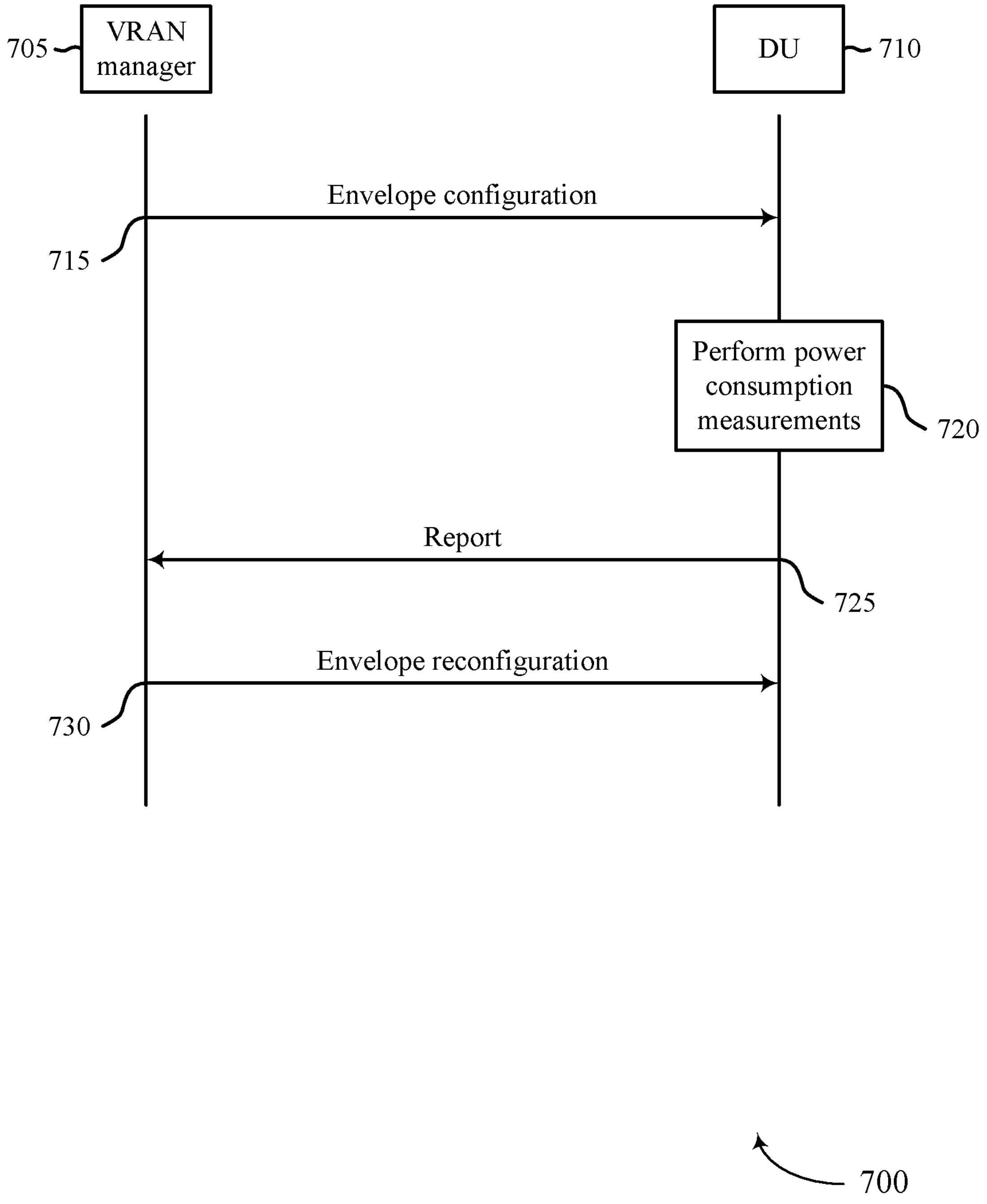
FIG. 7 illustrates an example of a process flow that supports an adaptive processing envelope based on power consumption in accordance with one or more aspects of the present disclosure.

FIG. 7 illustrates an example of a process flow 700 that supports an adaptive processing envelope based on power consumption in accordance with one or more aspects of the present disclosure. The process flow 700 includes a VRAN manager 705, which may be an example of a VRAN manager described with reference to FIGS. 1-6. The process flow 700 also includes a DU 710, which may be an example of a DU described with reference to FIGS. 1-6. The process flow 700 may implement aspects of the wireless communications system 100, the network architecture 200, or the wireless communications system 500. For example, the process flow 700 may support efficient techniques for reconfiguring a processing envelope for signal processing at the DU 710 or an RU based on power consumption at the DU 710.

In the following description of the process flow 700, the signaling exchanged between the VRAN manager 705 and the DU 710 may be exchanged in a different order than the example order shown, or the operations performed by the VRAN manager 705 and the DU 710 may be performed in different orders or at different times. Some operations may also be omitted from the process flow 700, and other operations may be added to the process flow 700.

At 715, the VRAN manager 705 may send, and the DU 710 may receive, a first processing envelope for signal processing at the DU 710. The signal processing may be associated with providing communications for one or more UEs 115. At 720, the DU 710 may perform power consumption measurements to determine the amount of power consumed when performing the signal processing. At 725, the DU 710 may send, and the VRAN manager 705 may receive, a report based on the amount of power consumed at the DU 710 during signal processing. In some cases, the report may include a power consumption value for each of multiple values along one or more dimensions supported by the first processing envelope. At 730, the VRAN manager 705 may send, and the DU 710 may receive, a second processing envelope for signal processing at the DU 710 based on the report.

In some cases, each dimension of the one or more dimensions supported by the first processing envelope may include a different quantity of layers, a different quantity of carriers, and a different BWP size (e.g., for each carrier). In some cases, the DU 710 may also send a level of resource utilization of the first processing envelope at the DU 710 (e.g., utilization of a pool of processing resources corresponding to the first processing envelope) or a temperature level during signal processing at the DU 710 in the report. In some cases, the VRAN manager 705 may determine to allocate more resources in the second processing envelope than the resources in the first processing envelope to the DU 710 based on the one or more power consumption values in the report (e.g., if the one or more power consumption values fail to satisfy a threshold). In some cases, the VRAN manager 705 may determine to allocate fewer resources in the second processing envelope than the resources in the first processing envelope to the DU 710 based on the one or more power consumption values in the report (e.g., if the one or more power consumption values satisfy a threshold).

In an example, the DU 710 may report the power consumption for performing signal processing for a first RU communicating on a first quantity of layers, a first quantity of carriers, and a first BWP size of each carrier. The first quantity of layers, the first quantity of carriers, and the first BWP size of each carrier may correspond to a dimension of a sub-envelope allocated to the first RU. The DU 710 may also report the power consumption for performing signal processing for a second RU communicating on a second quantity of layers, a second quantity of carriers, and a second BWP size of each carrier. The second quantity of layers, the second quantity of carriers, and the second BWP size of each carrier may correspond to a dimension of a sub-envelope allocated to the second RU.

The VRAN manager 705 may therefore be able to determine the power consumption at the DU 710 associated with signal processing for an RU in accordance with different dimensions of sub-envelopes at the RU. Thus, the VRAN manager 705 may reconfigure the sub-envelopes allocated to each RU connected to the DU 710 to minimize power consumption at the DU 710 while continuing to provide communications to one or more UEs 115. For instance, the VRAN manager 705 may allocate fewer resources to a first RU and more resources to a second RU if the VRAN manager 705 determines that such a configuration may reduce power consumption at the DU 710. The VRAN manager 705 may also reconfigure the resource envelope allocated to the DU 710 based on the power consumption at the DU 710.

Figure 8:
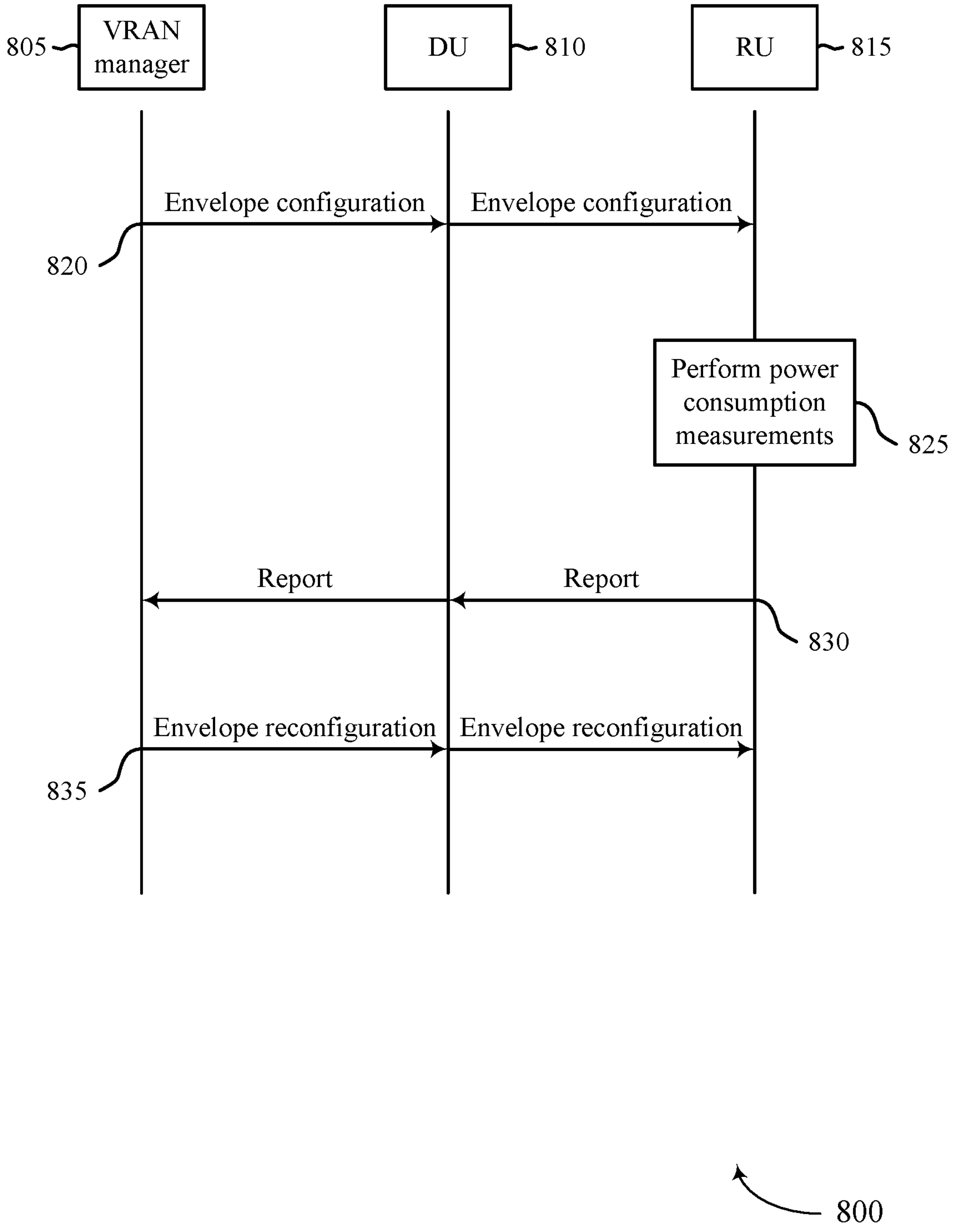
FIG. 8 illustrates an example of a process flow that supports an adaptive processing envelope based on power consumption in accordance with one or more aspects of the present disclosure.

FIG. 8 illustrates an example of a process flow 800 that supports an adaptive processing envelope based on power consumption in accordance with one or more aspects of the present disclosure. The process flow 800 includes a VRAN manager 805, which may be an example of a VRAN manager described with reference to FIGS. 1-7. The process flow 800 also includes a DU 810, which may be an example of a DU described with reference to FIGS. 1-7. The process flow 800 also includes an RU 815, which may be an example of an RU described with reference to FIGS. 1-7. The process flow 800 may implement aspects of the wireless communications system 100, the network architecture 200, or the wireless communications system 500. For example, the process flow 800 may support efficient techniques for reconfiguring a processing envelope for signal processing at the DU 810 or the RU 815 based on power consumption at the RU 815.

In the following description of the process flow 800, the signaling exchanged between the VRAN manager 805, the DU 810, and the RU 815 may be exchanged in a different order than the example order shown, or the operations performed by the VRAN manager 805, the DU 810, and the RU 815 may be performed in different orders or at different times. Some operations may also be omitted from the process flow 800, and other operations may be added to the process flow 800. For instance, instead of sending resource configurations to the RU 815 via the DU 810, the VRAN manager 805 may send the resource configurations directly to the RU 815. Similarly, instead of sending reports to the VRAN manager 805 via the DU 810, the RU 815 may send the reports directly to the VRAN manager 805.

At 820, the VRAN manager 805 may send, and the RU 815 may receive, a first processing envelope for signal processing at the RU 815. The signal processing may be associated with providing communications for one or more UEs 115. At 825, the RU 815 may perform power consumption measurements to determine the amount of power consumed when performing the signal processing. At 830, the RU 815 may send, and the VRAN manager 805 may receive, a report based on the amount of power consumed at the RU 815 during signal processing. In some cases, the report may include a power consumption value for each of multiple values along one or more dimensions supported by the first processing envelope. At 835, the VRAN manager 805 may send, and the RU 815 may receive, a second processing envelope for signal processing at the RU 815 based on the report.

In some cases, each dimension of the one or more dimensions supported by the first processing envelope may include a different quantity of PRBs and a different power backoff. In some cases, the RU 815 may also send a level of resource utilization of the first processing envelope (e.g., utilization of a pool of processing resources corresponding to the first processing envelope) at the RU 815 or a temperature level during signal processing at the RU 815 in the report. In some cases, the VRAN manager 805 may determine to allocate more resources in the second processing envelope than the resources in the first processing envelope to the RU 815 based on the one or more power consumption values in the report (e.g., if the one or more power consumption values fail to satisfy a threshold). In some cases, the VRAN manager 805 may determine to allocate fewer resources in the second processing envelope than the resources in the first processing envelope to the RU 815 based on the one or more power consumption values in the report (e.g., if the one or more power consumption values satisfy a threshold).

In an example, a first RU may report the power consumption for performing signal processing when communicating on a first quantity of PRBs with a first power backoff. The first quantity of PRBs and the first power backoff may correspond to a dimension of a sub-envelope allocated to the first RU. A second RU may then report the power consumption for performing signal processing when communicating on a second quantity of PRBs with a second power backoff. The second quantity of PRBs and the second power backoff may correspond to a dimension of a sub-envelope allocated to the second RU. The VRAN manager 805 may therefore be able to determine the power consumption at different RUs communicating in accordance with different dimensions of sub-envelopes at the RUs. Thus, the VRAN manager 805 may reconfigure the sub-envelopes allocated to each RU to minimize the total power consumption across all RUs or at particular RUs while continuing to provide communications to one or more UEs 115. For instance, the VRAN manager 805 may allocate fewer resources to a first RU and more resources to a second RU if the VRAN manager 805 determines that such a configuration may reduce power consumption across all RUs. Accordingly, the first RU, the second RU, or both may be configured to communicate on a different quantity of PRBs using a different power backoff.

In some cases, the techniques described with reference to FIG. 8 may be combined with the techniques described with reference to FIG. 7. In any case, the techniques described herein may allow for minimizing power consumption in a network at one or more RUs, a DU, or both.

Figure 9:
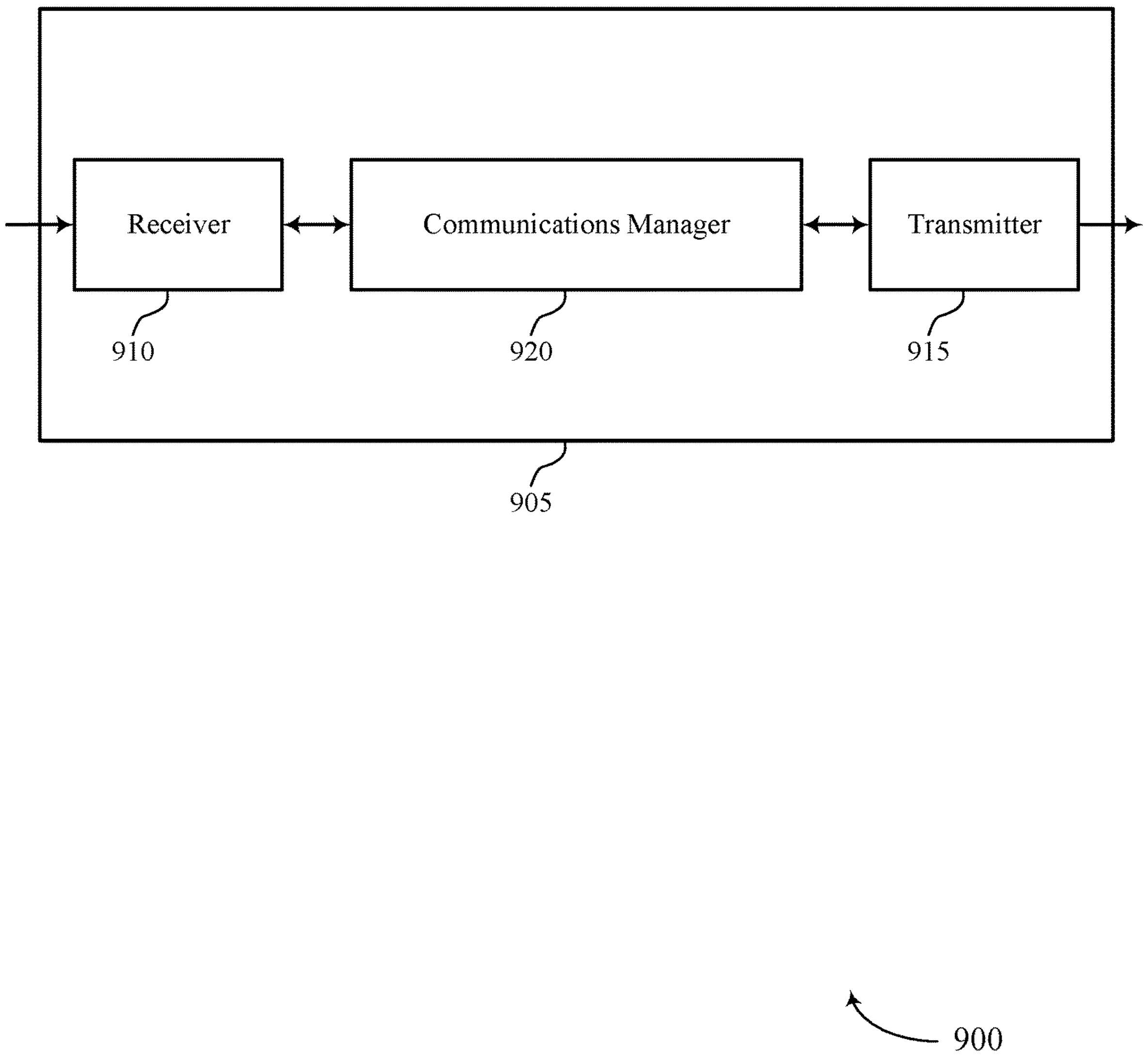
FIGS. 9 and 10 show block diagrams of devices that support an adaptive processing envelope based on power consumption in accordance with one or more aspects of the present disclosure.

FIG. 9 shows a block diagram 900 of a device 905 that supports an adaptive processing envelope based on power consumption in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of adaptive processing envelope based on power consumption as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a first network entity in accordance with examples as disclosed herein. For example, the communications manager 920 may be configured as or otherwise support a means for receiving, from a second network entity, a first processing envelope for signal processing at the first network entity, the signal processing associated with providing communications for UEs. The communications manager 920 may be configured as or otherwise support a means for sending, to a second network entity, a report based on an amount of power consumed at the first network entity during signal processing, the report including a power consumption value for each of a set of multiple values along one or more dimensions supported by the first processing envelope. The communications manager 920 may be configured as or otherwise support a means for receiving, from the second network entity, a second processing envelope for the signal processing at the first network entity, the second processing envelope being based on sending the report.

Additionally, or alternatively, the communications manager 920 may support wireless communication at a first network entity in accordance with examples as disclosed herein. For example, the communications manager 920 may be configured as or otherwise support a means for sending, to a second network entity, a first processing envelope for signal processing at the second network entity, the signal processing associated with providing communications for UEs. The communications manager 920 may be configured as or otherwise support a means for receiving, from the second network entity, a report based on an amount of power consumed at the second network entity during signal processing, the report including a power consumption value for each of a set of multiple values along one or more dimensions supported by the first processing envelope. The communications manager 920 may be configured as or otherwise support a means for sending, to the second network entity, a second processing envelope for the signal processing at the second network entity, the second processing envelope being based on receiving the report.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced power consumption. In particular, because a network entity may report power consumption values for different allocations of baseband resource envelopes, another network entity may be able to reconfigure baseband resource envelopes in a network to minimize power consumption and reduce OPEX.

Figure 10:
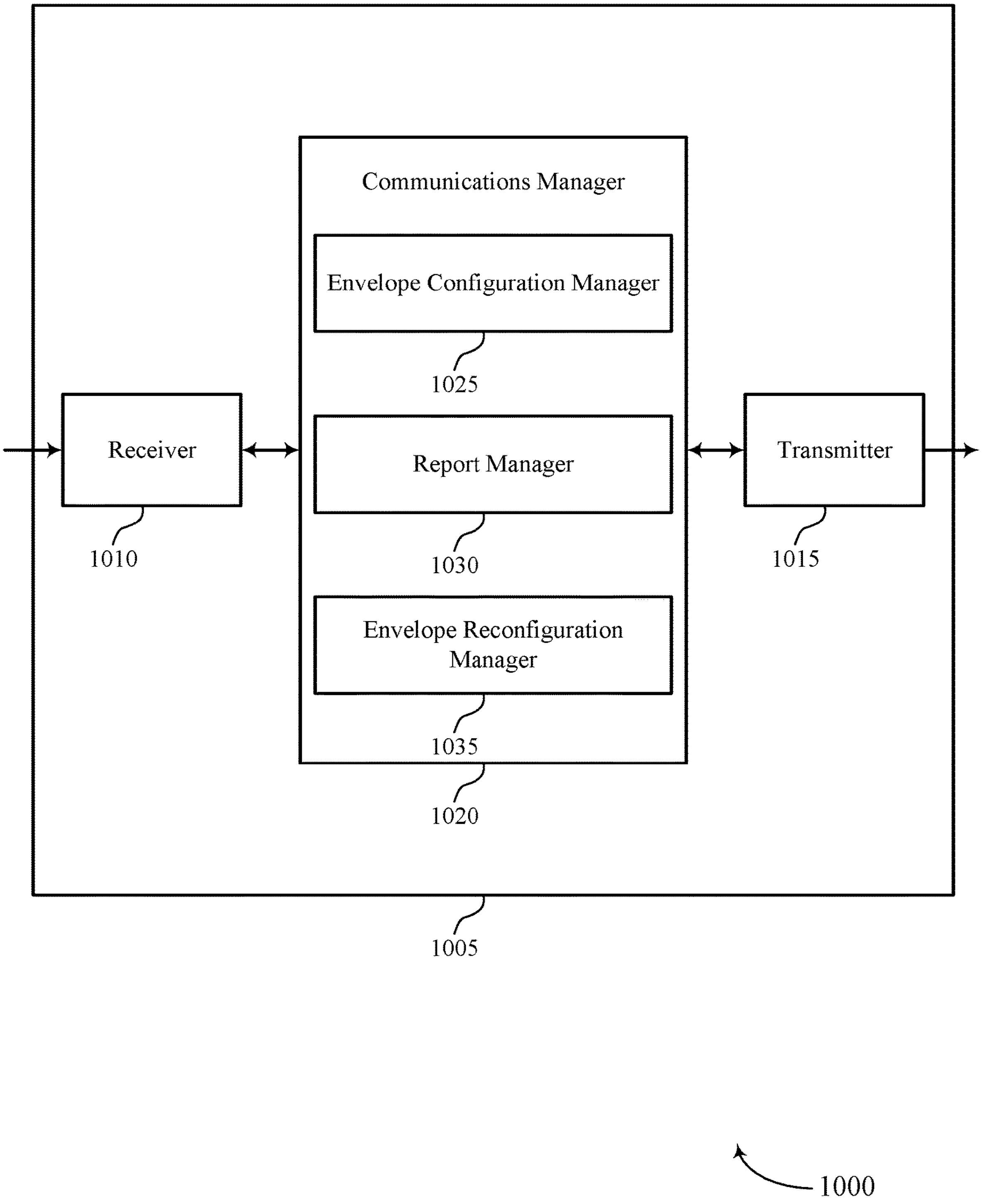

FIG. 10 shows a block diagram 1000 of a device 1005 that supports an adaptive processing envelope based on power consumption in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of adaptive processing envelope based on power consumption as described herein. For example, the communications manager 1020 may include an envelope configuration manager 1025, a report manager 1030, an envelope reconfiguration manager 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a first network entity in accordance with examples as disclosed herein. The envelope configuration manager 1025 may be configured as or otherwise support a means for receiving, from a second network entity, a first processing envelope for signal processing at the first network entity, the signal processing associated with providing communications for UEs. The report manager 1030 may be configured as or otherwise support a means for sending, to a second network entity, a report based on an amount of power consumed at the first network entity during signal processing, the report including a power consumption value for each of a set of multiple values along one or more dimensions supported by the first processing envelope. The envelope reconfiguration manager 1035 may be configured as or otherwise support a means for receiving, from the second network entity, a second processing envelope for the signal processing at the first network entity, the second processing envelope being based on sending the report.

Additionally, or alternatively, the communications manager 1020 may support wireless communication at a first network entity in accordance with examples as disclosed herein. The envelope configuration manager 1025 may be configured as or otherwise support a means for sending, to a second network entity, a first processing envelope for signal processing at the second network entity, the signal processing associated with providing communications for UEs. The report manager 1030 may be configured as or otherwise support a means for receiving, from the second network entity, a report based on an amount of power consumed at the second network entity during signal processing, the report including a power consumption value for each of a set of multiple values along one or more dimensions supported by the first processing envelope. The envelope reconfiguration manager 1035 may be configured as or otherwise support a means for sending, to the second network entity, a second processing envelope for the signal processing at the second network entity, the second processing envelope being based on receiving the report.

Figure 11:
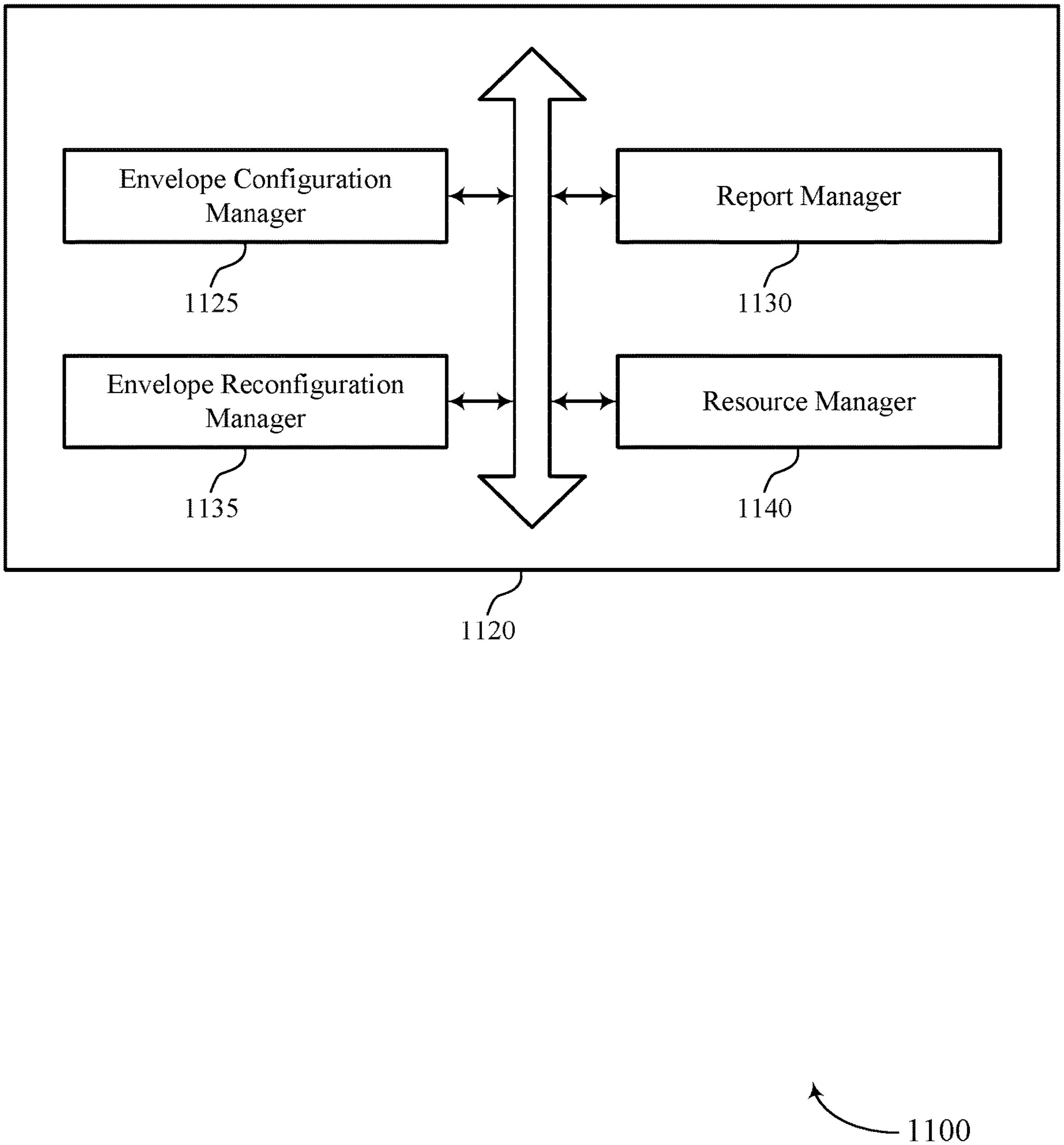
FIG. 11 shows a block diagram of a communications manager that supports an adaptive processing envelope based on power consumption in accordance with one or more aspects of the present disclosure.

FIG. 11 shows a block diagram 1100 of a communications manager 1120 that supports an adaptive processing envelope based on power consumption in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of adaptive processing envelope based on power consumption as described herein. For example, the communications manager 1120 may include an envelope configuration manager 1125, a report manager 1130, an envelope reconfiguration manager 1135, a resource manager 1140, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a first network entity in accordance with examples as disclosed herein. The envelope configuration manager 1125 may be configured as or otherwise support a means for receiving, from a second network entity, a first processing envelope for signal processing at the first network entity, the signal processing associated with providing communications for UEs. The report manager 1130 may be configured as or otherwise support a means for sending, to a second network entity, a report based on an amount of power consumed at the first network entity during signal processing, the report including a power consumption value for each of a set of multiple values along one or more dimensions supported by the first processing envelope. The envelope reconfiguration manager 1135 may be configured as or otherwise support a means for receiving, from the second network entity, a second processing envelope for the signal processing at the first network entity, the second processing envelope being based on sending the report.

In some examples, each dimension of the one or more dimensions supported by the first processing envelope includes a different quantity of layers, different quantity of carriers, a different bandwidth part, a different power back-off, or a combination thereof.

In some examples, the first network entity includes a distributed unit, and the report manager 1130 may be configured as or otherwise support a means for sending, in the report for each of the one or more dimensions supported by the first processing envelope, a level of resource utilization of the first processing envelope at the first network entity, a temperature level during signal processing at the first network entity, or a combination thereof.

In some examples, a size of the second processing envelope is greater than a size of the first processing envelope based on one or more power consumption values in the report failing to satisfy a threshold.

In some examples, a size of the second processing envelope is less than or equal to a size of the first processing envelope based on one or more power consumption values in the report satisfying a threshold.

In some examples, the first network entity includes a distributed unit or a radio unit, and the second network entity includes a distributed unit or a host platform for a virtual radio access network entity.

Additionally, or alternatively, the communications manager 1120 may support wireless communication at a first network entity in accordance with examples as disclosed herein. In some examples, the envelope configuration manager 1125 may be configured as or otherwise support a means for sending, to a second network entity, a first processing envelope for signal processing at the second network entity, the signal processing associated with providing communications for UEs. In some examples, the report manager 1130 may be configured as or otherwise support a means for receiving, from the second network entity, a report based on an amount of power consumed at the second network entity during signal processing, the report including a power consumption value for each of a set of multiple values along one or more dimensions supported by the first processing envelope. In some examples, the envelope reconfiguration manager 1135 may be configured as or otherwise support a means for sending, to the second network entity, a second processing envelope for the signal processing at the second network entity, the second processing envelope being based on receiving the report.

In some examples, each dimension of the one or more dimensions supported by the first processing envelope includes a different quantity of layers, different quantity of carriers, a different bandwidth part, a different power back-off, or a combination thereof.

In some examples, the second network entity includes a distributed unit, and the report manager 1130 may be configured as or otherwise support a means for receiving, in the report for each of the one or more dimensions supported by the first processing envelope, a level of resource utilization of the first processing envelope at the second network entity, a temperature level during signal processing at the second network entity, or a combination thereof.

In some examples, the resource manager 1140 may be configured as or otherwise support a means for determining to allocate more resources in the second processing envelope than the resources in the first processing envelope to the second network entity based on one or more power consumption values in the report failing to satisfy a threshold.

In some examples, the resource manager 1140 may be configured as or otherwise support a means for determining to allocate fewer resources in the second processing envelope than the resources in the first processing envelope to the second network entity based on one or more power consumption values in the report satisfying a threshold.

In some examples, the first network entity includes a distributed unit or a host platform for a virtual radio access network entity, and the second network entity includes a distributed unit or a radio unit.

Figure 12:
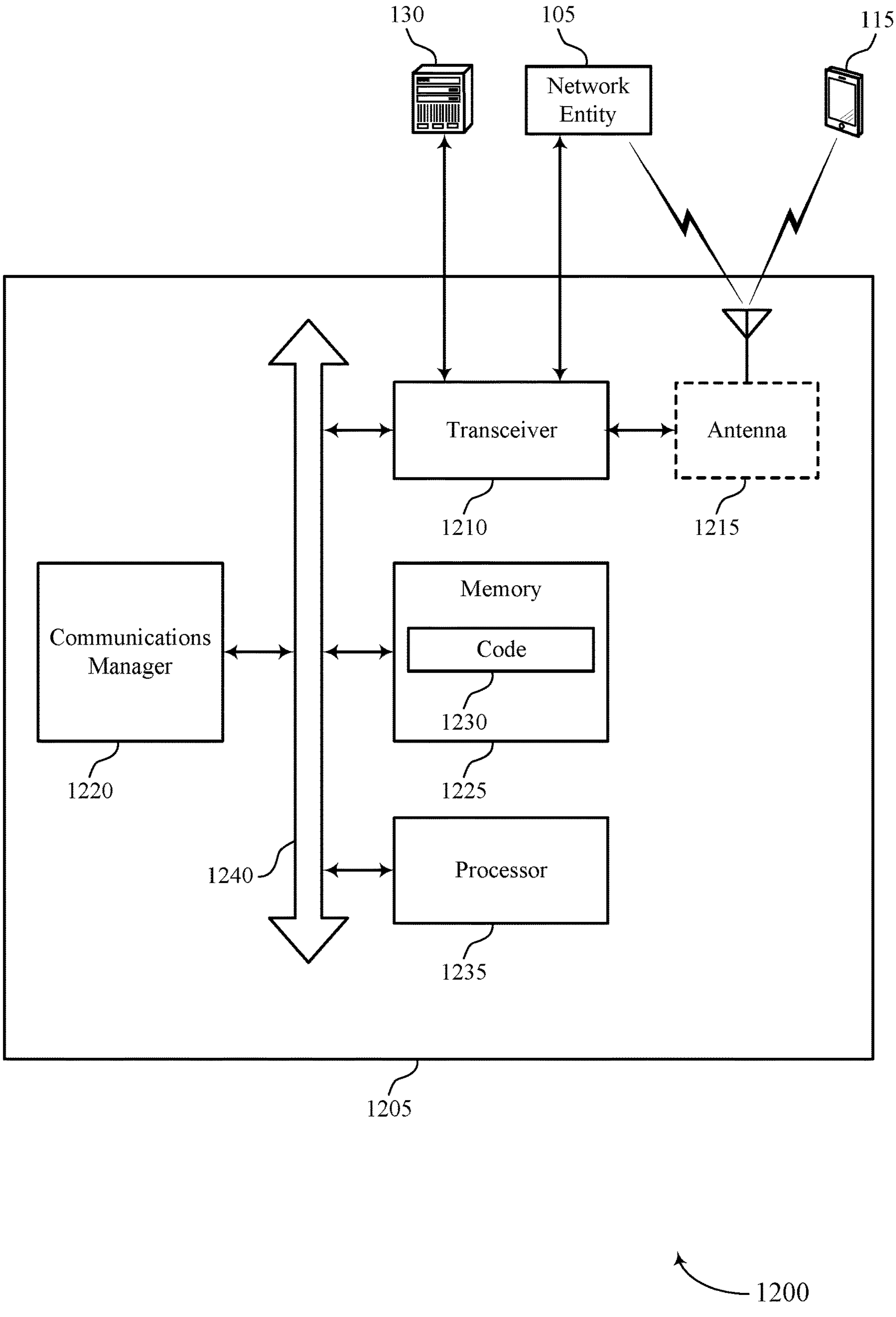
FIG. 12 shows a diagram of a system including a device that supports an adaptive processing envelope based on power consumption in accordance with one or more aspects of the present disclosure.

FIG. 12 shows a diagram of a system 1200 including a device 1205 that supports an adaptive processing envelope based on power consumption in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting adaptive processing envelope based on power consumption). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a first network entity in accordance with examples as disclosed herein. For example, the communications manager 1220 may be configured as or otherwise support a means for receiving, from a second network entity, a first processing envelope for signal processing at the first network entity, the signal processing associated with providing communications for UEs. The communications manager 1220 may be configured as or otherwise support a means for sending, to a second network entity, a report based on an amount of power consumed at the first network entity during signal processing, the report including a power consumption value for each of a set of multiple values along one or more dimensions supported by the first processing envelope. The communications manager 1220 may be configured as or otherwise support a means for receiving, from the second network entity, a second processing envelope for the signal processing at the first network entity, the second processing envelope being based on sending the report.

Additionally, or alternatively, the communications manager 1220 may support wireless communication at a first network entity in accordance with examples as disclosed herein. For example, the communications manager 1220 may be configured as or otherwise support a means for sending, to a second network entity, a first processing envelope for signal processing at the second network entity, the signal processing associated with providing communications for UEs. The communications manager 1220 may be configured as or otherwise support a means for receiving, from the second network entity, a report based on an amount of power consumed at the second network entity during signal processing, the report including a power consumption value for each of a set of multiple values along one or more dimensions supported by the first processing envelope. The communications manager 1220 may be configured as or otherwise support a means for sending, to the second network entity, a second processing envelope for the signal processing at the second network entity, the second processing envelope being based on receiving the report.

By including or configuring the communications manager 1220 in accordance with examples as described herein, the device 1205 may support techniques for reduced power consumption. In particular, because a network entity may report power consumption values for different allocations of baseband resource envelopes, another network entity may be able to reconfigure baseband resource envelopes in a network to minimize power consumption and reduce OPEX.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of adaptive processing envelope based on power consumption as described herein, or the processor 1235 and the memory 1225 may be otherwise configured to perform or support such operations.

FIG. 13 shows a flowchart illustrating a method 1300 that supports an adaptive processing envelope based on power consumption in accordance with one or more aspects of the present disclosure. The operations of the method 1300 may be implemented by a network entity or its components as described herein. For example, the operations of the method 1300 may be performed by a network entity as described with reference to FIGS. 1 through 12. In some examples, a network entity may execute a set of instructions to control the functional elements of the network entity to perform the described functions. Additionally, or alternatively, the network entity may perform aspects of the described functions using special-purpose hardware.

At 1305, the method may include receiving, from a second network entity, a first processing envelope for signal processing at the first network entity, the signal processing associated with providing communications for UEs. The operations of 1305 may be performed in accordance with examples as disclosed herein. In some examples, aspects of the operations of 1305 may be performed by an envelope configuration manager 1125 as described with reference to FIG. 11.

At 1310, the method may include sending, to a second network entity, a report based on an amount of power consumed at the first network entity during signal processing, the report including a power consumption value for each of a set of multiple values along one or more dimensions supported by the first processing envelope. The operations of 1310 may be performed in accordance with examples as disclosed herein. In some examples, aspects of the operations of 1310 may be performed by a report manager 1130 as described with reference to FIG. 11.

At 1315, the method may include receiving, from the second network entity, a second processing envelope for the signal processing at the first network entity, the second processing envelope being based on sending the report. The operations of 1315 may be performed in accordance with examples as disclosed herein. In some examples, aspects of the operations of 1315 may be performed by an envelope reconfiguration manager 1135 as described with reference to FIG. 11.

Figure 14:
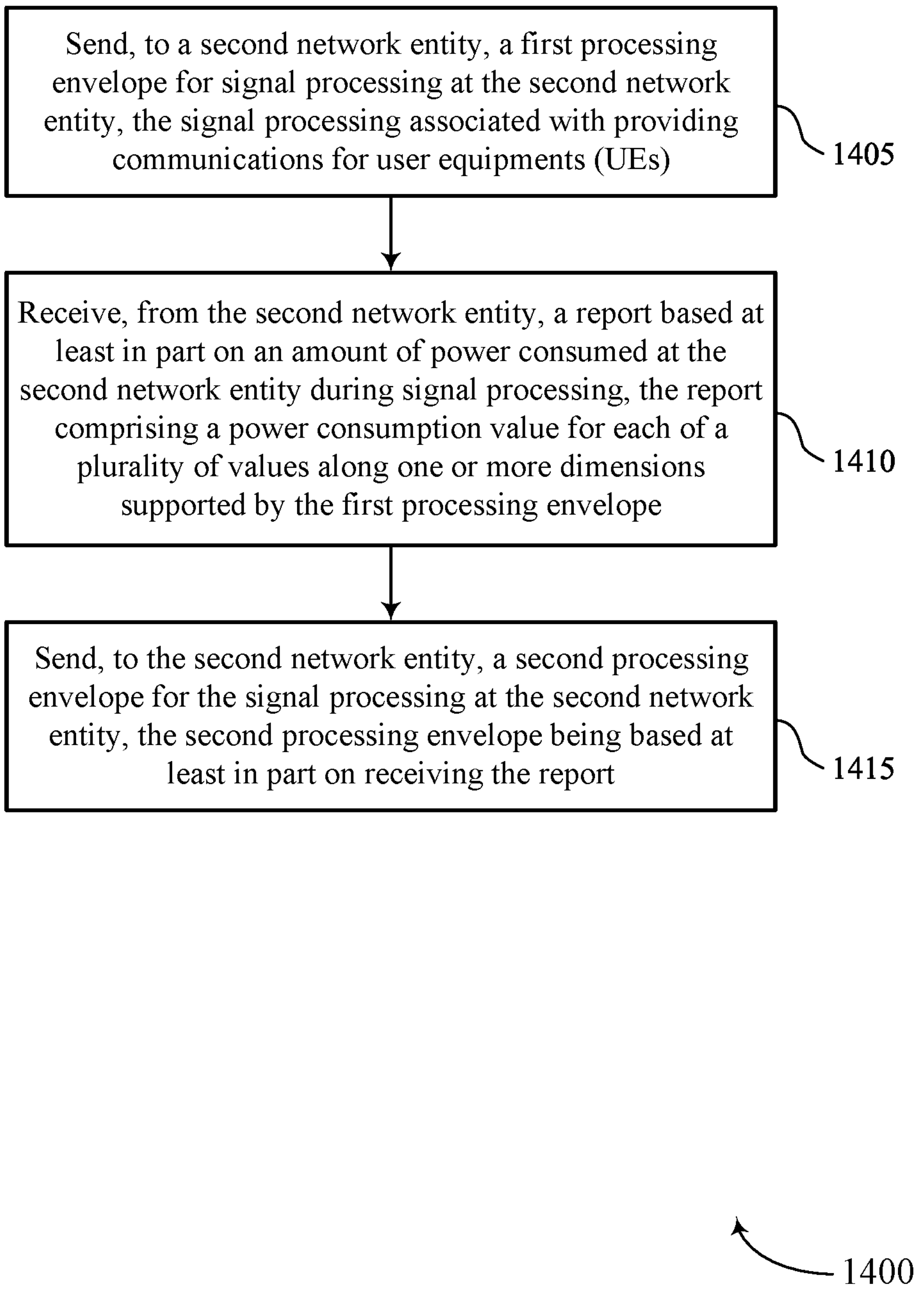

FIG. 14 shows a flowchart illustrating a method 1400 that supports an adaptive processing envelope based on power consumption in accordance with one or more aspects of the present disclosure. The operations of the method 1400 may be implemented by a network entity or its components as described herein. For example, the operations of the method 1400 may be performed by a network entity as described with reference to FIGS. 1 through 12. In some examples, a network entity may execute a set of instructions to control the functional elements of the network entity to perform the described functions. Additionally, or alternatively, the network entity may perform aspects of the described functions using special-purpose hardware.

At 1405, the method may include sending, to a second network entity, a first processing envelope for signal processing at the second network entity, the signal processing associated with providing communications for UEs. The operations of 1405 may be performed in accordance with examples as disclosed herein. In some examples, aspects of the operations of 1405 may be performed by an envelope configuration manager 1125 as described with reference to FIG. 11.

At 1410, the method may include receiving, from the second network entity, a report based on an amount of power consumed at the second network entity during signal processing, the report including a power consumption value for each of a set of multiple values along one or more dimensions supported by the first processing envelope. The operations of 1410 may be performed in accordance with examples as disclosed herein. In some examples, aspects of the operations of 1410 may be performed by a report manager 1130 as described with reference to FIG. 11.

At 1415, the method may include sending, to the second network entity, a second processing envelope for the signal processing at the second network entity, the second processing envelope being based on receiving the report. The operations of 1415 may be performed in accordance with examples as disclosed herein. In some examples, aspects of the operations of 1415 may be performed by an envelope reconfiguration manager 1135 as described with reference to FIG. 11.

(A summary supporting multiple-dependent claims will be added upon final approval of the claims)

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first network entity, comprising:
- one or more processors;
- one or more memories coupled with the one or more processors; and
- instructions stored in the one or more memories and executable by the one or more processors to cause the apparatus to:
  - receive, from a second network entity, a first processing envelope for signal processing at the first network entity, the signal processing associated with providing communications for user equipments (UEs);
  - send, to a second network entity, a report based at least in part on signal processing at the first network entity, the report comprising a power consumption value for each of a plurality of values along one or more dimensions supported by the first processing envelope, wherein each dimension of the one or more dimensions supported by the first processing envelope comprises a different quantity of layers, a different quantity of carriers, a different bandwidth part, a different power back-off, or a combination thereof, and wherein the report further comprises a temperature level during signal processing at the first network entity for each of the one or more dimensions supported by the first processing envelope; and
  - receive, from the second network entity, a second processing envelope for the signal processing at the first network entity, the second processing envelope being based at least in part on sending the report, wherein a size of the second processing envelope is different than a size of the first processing envelope based at least in part on one or more power consumption values in the report and a threshold.

2. The apparatus of claim 1, wherein the first network entity comprises a distributed unit, and the instructions are further executable by the one or more processors to cause the apparatus to:
- send, in the report for each of the one or more dimensions supported by the first processing envelope, a level of resource utilization of the first processing envelope at the first network entity.

3. The apparatus of claim 1, wherein the size of the second processing envelope is greater than the size of the first processing envelope based at least in part on the one or more power consumption values in the report failing to satisfy the threshold.

4. The apparatus of claim 1, wherein the size of the second processing envelope is less than or equal to the size of the first processing envelope based at least in part on the one or more power consumption values in the report satisfying the threshold.

5. The apparatus of claim 1, wherein the first network entity comprises a distributed unit or a radio unit, and the second network entity comprises a distributed unit or a host platform for a virtual radio access network entity.

6. An apparatus for wireless communication at a first network entity, comprising:
- one or more processors;
- one or more memories coupled with the one or more processors; and instructions stored in the one or more memories and executable by the one or more processors to cause the apparatus to:

send, to a second network entity, a first processing envelope for signal processing at the second network entity, the signal processing associated with providing communications for user equipments (UEs);

receive, from the second network entity, a report based at least in part on signal processing at the first network entity, the report comprising a power consumption value for each of a plurality of values along one or more dimensions supported by the first processing envelope, wherein each dimension of the one or more dimensions supported by the first processing envelope comprises a different quantity of layers, a different quantity of carriers, a different bandwidth part, a different power back-off, or a combination thereof, and wherein the report further comprises a temperature level during signal processing at the first network entity for each of the one or more dimensions supported by the first processing envelope; and send, to the second network entity, a second processing envelope for the signal processing at the second network entity, the second processing envelope being based at least in part on receiving the report, wherein a size of the second processing envelope is different than a size of the first processing envelope based at least in part on one or more power consumption values in the report and a threshold.

7. The apparatus of claim 6, wherein the second network entity comprises a distributed unit, and the instructions are further executable by the one or more processors to cause the apparatus to:

receive, in the report for each of the one or more dimensions supported by the first processing envelope, a level of resource utilization of the first processing envelope at the second network entity.

8. The apparatus of claim 6, wherein the instructions are further executable by the one or more processors to cause the apparatus to:

determine to allocate more resources in the second processing envelope than in the first processing envelope to the second network entity based at least in part on one or more power consumption values in the report failing to satisfy a threshold.

9. The apparatus of claim 6, wherein the instructions are further executable by the one or more processors to cause the apparatus to:

determine to allocate fewer resources in the second processing envelope than in the first processing envelope to the second network entity based at least in part on one or more power consumption values in the report satisfying a threshold.

10. The apparatus of claim 6, wherein the first network entity comprises a distributed unit or a host platform for a virtual radio access network entity, and the second network entity comprises a distributed unit or a radio unit.

11. A method for wireless communication at a first network entity, comprising:

receiving, from a second network entity, a first processing envelope for signal processing at the first network entity, the signal processing associated with providing communications for user equipments (UEs);

sending, to a second network entity, a report based at least in part on signal processing at the first network entity, the report comprising a power consumption value for each of a plurality of values along one or more dimensions supported by the first processing envelope, wherein each dimension of the one or more dimensions supported by the first processing envelope comprises a different quantity of layers, a different quantity of carriers, a different bandwidth part, a different power back-off, or a combination thereof, and wherein the report further comprises a temperature level during signal processing at the first network entity for each of the one or more dimensions supported by the first processing envelope; and receiving, from the second network entity, a second processing envelope for the signal processing at the first network entity, the second processing envelope being based at least in part on sending the report, wherein a size of the second processing envelope is different than a size of the first processing envelope based at least in part on one or more power consumption values in the report and a threshold.

12. The method of claim 11, wherein the first network entity comprises a distributed unit, the method further comprising:

sending, in the report for each of the one or more dimensions supported by the first processing envelope, a level of resource utilization of the first processing envelope at the first network entity.

13. The method of claim 11, wherein the size of the second processing envelope is greater than the size of the first processing envelope based at least in part on the one or more power consumption values in the report failing to satisfy the threshold.

14. The method of claim 11, wherein the size of the second processing envelope is less than or equal to the size of the first processing envelope based at least in part on the one or more power consumption values in the report satisfying the threshold.

15. The method of claim 11, wherein the first network entity comprises a distributed unit or a radio unit, and the second network entity comprises a distributed unit or a host platform for a virtual radio access network entity.

16. A method for wireless communication at a first network entity, comprising:

sending, to a second network entity, a first processing envelope for signal processing at the second network entity, the signal processing associated with providing communications for user equipments (UEs);

receiving, from the second network entity, a report based at least in part on signal processing at the first network entity, the report comprising a power consumption value for each of a plurality of values along one or more dimensions supported by the first processing envelope, wherein each dimension of the one or more dimensions supported by the first processing envelope comprises a different quantity of layers, a different quantity of carriers, a different bandwidth part, a different power back-off, or a combination thereof, and wherein the report further comprises a temperature level during signal processing at the first network entity for each of the one or more dimensions supported by the first processing envelope; and sending, to the second network entity, a second processing envelope for the signal processing at the second network entity, the second processing envelope being based at least in part on receiving the report, wherein a size of the second processing envelope is different than a size of the first processing envelope based at least in part on one or more power consumption values in the report and a threshold.

17. The method of claim 16, wherein the second network entity comprises a distributed unit, the method further comprising:

receiving, in the report for each of the one or more dimensions supported by the first processing envelope, a level of resource utilization of the first processing envelope at the second network entity, a temperature level during signal processing at the second network entity, or a combination thereof.

18. The method of claim 16, further comprising:

determining to allocate more resources in the second processing envelope than in the first processing envelope to the second network entity based at least in part on one or more power consumption values in the report failing to satisfy a threshold.

19. The method of claim 16, further comprising:

determining to allocate fewer resources in the second processing envelope than in the first processing envelope to the second network entity based at least in part on one or more power consumption values in the report satisfying a threshold.

20. The method of claim 16, wherein the first network entity comprises a distributed unit or a host platform for a virtual radio access network entity, and the second network entity comprises a distributed unit or a radio unit.

* * * * *